United States Patent

Song et al.

Patent Number: 5,844,704
Date of Patent: Dec. 1, 1998

[54] OPTICAL PACKET ADDRESS DETECTOR

[75] Inventors: Seok-Ho Song; Jong-Sool Jung, both of Daejeon, Rep. of Korea

[73] Assignee: Electronics and Telecommunications Research Institute, Daejeon, Rep. of Korea

[21] Appl. No.: 718,238

[22] Filed: Sep. 20, 1996

[30] Foreign Application Priority Data

Dec. 20, 1995 [KR] Rep. of Korea .................. 1995 52650

[51] Int. Cl.⁶ .................................................. H04B 10/12
[52] U.S. Cl. ........................ 359/138; 359/130; 359/165; 359/163; 385/37
[58] Field of Search ................................... 359/127, 129, 359/130, 131, 135, 138, 163, 165; 385/37, 24, 33

[56] References Cited

U.S. PATENT DOCUMENTS

| | | | |
|---|---|---|---|
| 4,715,027 | 12/1987 | Mahapatra et al. ...................... | 359/130 |
| 4,773,063 | 9/1988 | Hunsperger et al. .................... | 359/130 |
| 4,852,079 | 7/1989 | Kinney et al. ........................... | 359/130 |
| 5,172,258 | 12/1992 | Verber ...................................... | 359/138 |
| 5,355,237 | 10/1994 | Lang et al. ............................... | 359/130 |

OTHER PUBLICATIONS

Focusing–grating–coupler arrays for uniform and efficient signal distribution in a backboard optical interconnect; Seok Ho Song and El Hang Lee; Sep. 1995; vol. 34, No. 36; pp. 5913–5919.

Optical Integrated Circuits; Hiroshi Nishihara, Masamitsu Haruna and Toshiaki Suhara; Jul. 1991; pp. 83–94.

*Primary Examiner*—Leslie Pascal
*Attorney, Agent, or Firm*—Antonelli, Terry, Stout & Kraus, LLP

[57] ABSTRACT

An improved optical packet address detector which is capable of enabling a high speed packet switching network of 100 Gbps, which includes a glass substrate having a mirror disposed at the back side thereof; a channel optical waveguide formed on the glass substrate and extended in a predetermined direction; a plurality of grating couplers spaced-apart on the channel optical waveguide for dispersing a packet signal beam passing through the channel optical waveguide into the inside of the glass substrate; an optical absorber attached to one end of the channel optical waveguide for absorbing part of the packet signal beam which is not dispersed by the grating coupler; a reflective lens spaced-apart from the optical absorber by a predetermined distance and formed on the glass substrate for focusing the signal beam dispersed by the grating coupler and reflected by the mirror; and a detector spaced-apart from the reflective lens and formed on the glass substrate for detecting the signal beam passing through the reflective lens and the mirror.

4 Claims, 3 Drawing Sheets

OPTICAL PACKET ADDRESS DETECTOR

BACKGROUND OF THE INVENTION

1. Field of the Invention

The present invention relates to an optical packet address detector, and particularly to an improved optical packet address detector of a switching node of an optical communication network which enables a high speed packet switching network of 100 Gbps.

2. Description of the Conventional Art

Generally, a wide range communication network service requires a high speed packet communication network which enables of enabling a digital information communication in which a data and a video signal are combined.

The conventional optical packet address unit generally utilizes an optical fiber, and has a packet address detection speed of a few or tens of giga bits per second.

Therefore, the conventional optical packet address unit is disadvantageous for enabling a small size integration of other opto-electronic integrated circuit.

In addition, the communication speed is very slow due to the difference between the data transmission speed and the link transmission speed of the optical communication system because of the limit of the electronic signal processing speed at each node of the packet communication network.

SUMMARY OF THE INVENTION

Accordingly, it is an object of the present invention to provide an improved optical packet address detector which overcomes the problems encountered in the conventional optical packet address detector.

It is another object of the present invention to provide an optical packet address detector which enables a high speed packet switching network of 100 Gbps.

It is another object of the present invention to provide an optical packet address detector which is capable of implementing the optical packet communication network and is capable of more effectively performing the optical packet signal control of optical communication network without optical-to-electrical signal conversion or electrical-to-optical signal conversion of the packet at each node of the packet communication system.

To achieve the above objects, there is provided an optical packet address detector, which includes a glass substrate having a mirror layer coated at the back side thereof; a channel optical waveguide formed on the glass substrate and extended in a predetermined direction; a plurality of grating couplers spaced-apart on the channel optical waveguide for diffracting packet signal beams from the channel optical waveguide toward the inside of the glass substrate; an optical absorber attached to one end of the channel optical waveguide for absorbing part of the packet signal beam which is not diffracted by the grating couplers; a reflective lens spaced-apart from the optical absorber by a predetermined distance and formed on the glass substrate for focusing the signal beam diffracted by the grating coupler; and a detector spaced-apart from the reflective lens and formed on the glass substrate for detecting the signal beam passing through the mirror and the reflective lens.

Additional advantages, objects and other features of the invention will be set forth in part in the description which follows and in part will become apparent to those having ordinary skill in the art upon examination of the following description or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1A:
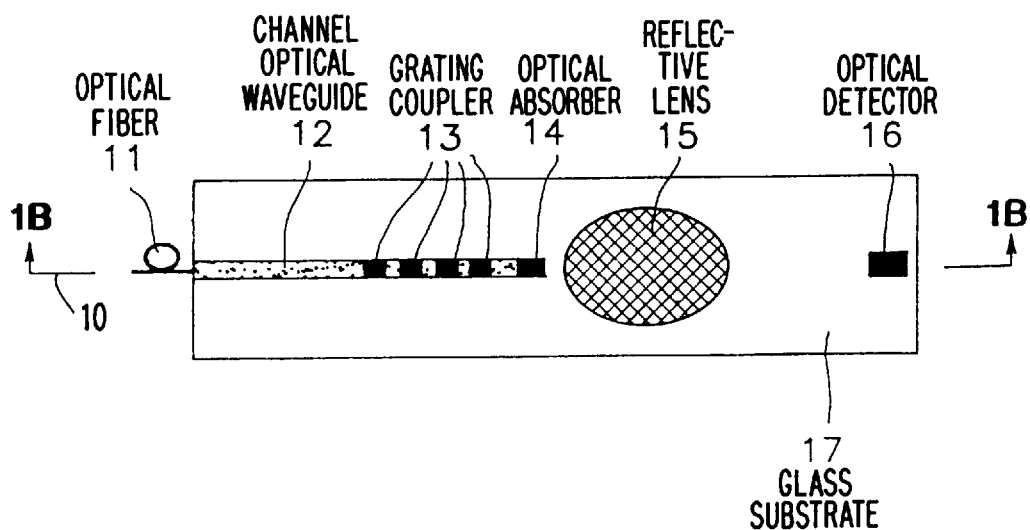
FIG. 1A is a top view showing an optical communication packet address detector according to the present invention.
Figure 1B:
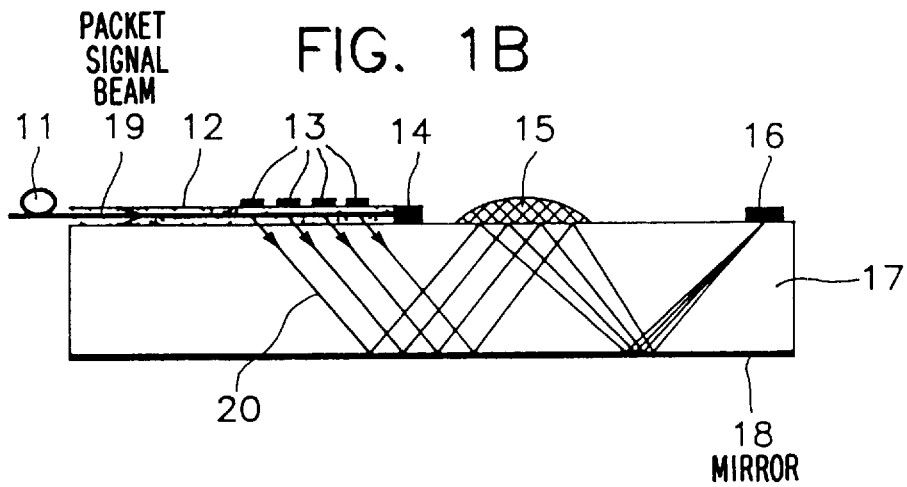
FIG. 1B is a cross-sectional view taken along the line A–A' of FIG. 1A according to the present invention.

FIGS. 1A and 1B show an optical communication packet address detector according to the present invention.

In the drawings, reference numeral 11 denotes an optical fiber, 12 denotes a channel optical waveguide, 13 denotes a grating coupler, 14 denotes an optical absorber, 15 denotes a reflective lens, 16 denotes an optical detector, 17 denotes a glass substrate, 18 denotes a mirror, 19 denotes a packet signal beam guided by the optical fiber 11, and 20 denotes a radiated beam.

The construction of the packet address detector according to the present invention will now be described with reference to FIGS. 1A and 1B.

First, the packet address detector includes the mirror 18 for reflecting the beam incident on the back side of the glass substrate 17. The channel optical waveguide 12 is adapted in order for the beam to be guided in a predetermined direction and is directed to transferring the beam (signal) incident via the optical fiber 11. A plurality of spaced-apart grating couplers 13 are disposed on the channel optical waveguide 12 and are perpendicular with respect to the extending direction of the channel optical waveguide 12 in order for the incident beam passing through the channel optical waveguide 12 to be diffracted toward the inner side of the glass substrate 17.

The optical absorber 14 is connected to the end of the channel optical waveguide 12 to prevent the beam passed through the channel optical waveguide 12 from being dispersed and to absorb the beam transmitted thereto.

The reflective lens 15 is disposed on the glass substrate 17 at the periphery of the optical absorber 14 so as to focus the radiated beam 20 reflected by the mirror 18 onto the optical detector 16.

The optical detector 16 is directed to detecting the beam incident from the reflective lens and reflected by the mirror 18.

The optical packet signal composed of bits of "1" or "0" is input to the optical packet address detector of the present invention and is transmitted to the channel optical waveguide 12. Here, an "N" number of the grating couplers 13 (in this embodiment, the number of "N" is preferably four (4)) disposed on the channel optical waveguide 12 is directed to judging as to whether the signal inputted is referred thereto.

The bits signal beams of the packet signal are radiated into the inside of the glass substrate 17 by the grating coupler 13 and serve to generate an "N" number of radiated beams 20.

Namely, the optical intensity is evenly dispersed to each of the "N" number of the grating couplers 13, and the remaining beams (signal) which are not diffracted are absorbed by the optical absorber 14 and become invalid.

In addition, the radiated beams which are diffracted in the "N" number are reflected by the mirror 18 and become incident on and focused by the reflective lens 15 at the detector 16, and are then detected thereby.

Figure 2A:
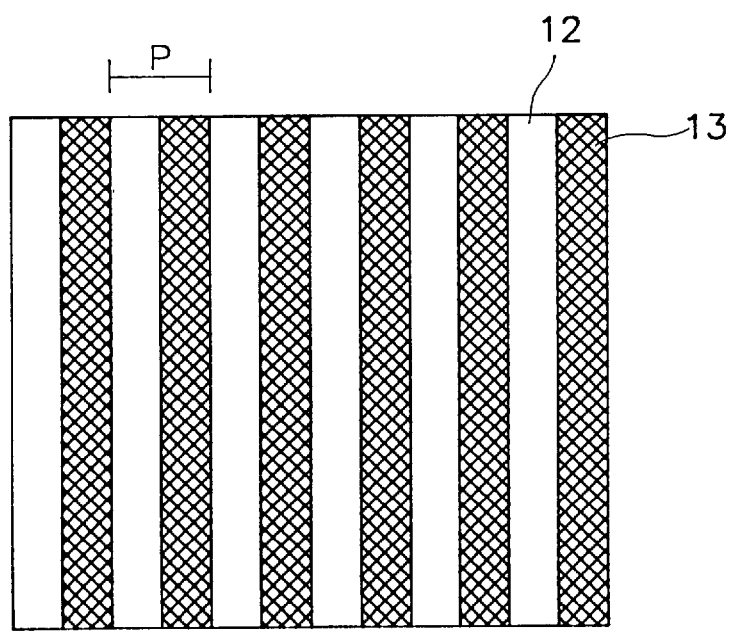
FIG. 2A is a top of one of the grating view showing a planar configuration of a grating coupler of FIG. 1A according to the present invention.
Figure 2B:
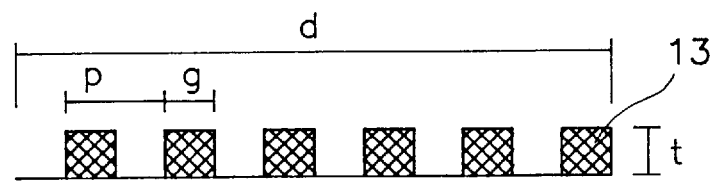
FIG. 2B is a cross-sectional view taken along the line of FIG. 2A according to the present invention.

FIGS. 2A and 2B show one of the grating couplers of FIG. 1A according to the present invention.

As shown therein, each of the grating couplers consists of a plurality of the line-shaped grating layers deposited on the channel optical waveguide 12.

In the drawings, reference character "d" denotes the length of the grating coupler 13, "p" denotes a line-shaped period, "g/p" denotes a duty cycle, and "t" denotes the thickness of the grating layer.

Figure 3:
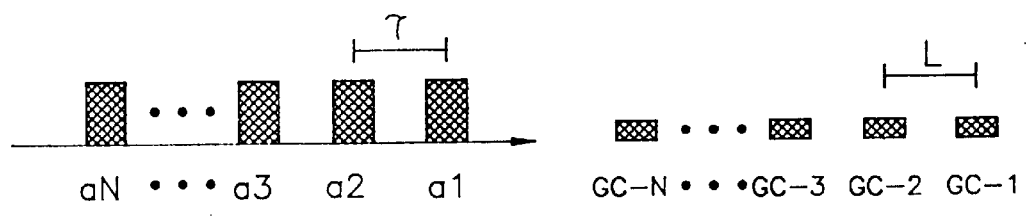
FIG. 3 is a view showing an arrangement of a packet signal of an input signal and a grating coupler according to the present invention.

FIG. 3 shows the arrangement of the packet input signal and the grating coupler.

The packet input signal and the grating coupler will now be described with reference to FIG. 3.

In the drawings, the packet signal composed of an "N" number of bits (a1, a2, . . . , aN) is shown to the left thereof, and the grating couplers composed of an "N" number of grating couplers (GC-1, GC-2, . . . , GC-n) are shown to the right thereof, where L is referred to Cτ/n, τ denotes the time interval between bits, L denotes the interval of the grating coupler, and n denotes the refractive index of the channel waveguide 12.

The packet signal becomes incident on the channel optical waveguide 12 via the optical fiber 11 in the order of the "N" number of bits a1, a2, . . . , aN.

The bit signals are processed by the "N" number of the grating coupler in the order of GC-n, . . . , GC-2, GC-1. When the bit a1 reaches the GC-1, all the input bit signals from all the grating couplers are diffracted toward the substrate.

At this time, the intensity of the beam signals detected by the optical detector 16 is referred to the level of "N×Io" which is "N" times the Io where the Io denotes the intensity of one bit transmitted from the grating coupler.

When excluding one grating coupler (the "i"th grating coupler) among the "N" number of the grating couplers, since the intensity of the beam transmitted from the "i"th input bit is excluded, the intensity of the beam detected is referred to (N−1)*Io.

Figure 4:
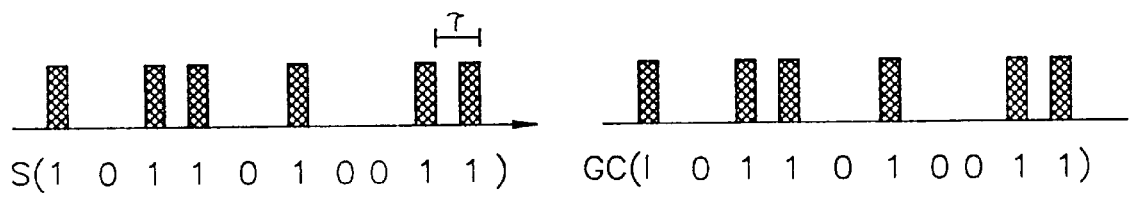
FIG. 4 is a view showing an example wherein the input signal, the grating coupler arrangement, and the input packet signal are identified according to the present invention.

Referring to FIG. 4, there is shown one example that the input signal and the grating coupler arrangement and the input packet signal are identical in the packet address detector according to the present invention. The example for detecting 10-bit packet signal (S=1011010011) will now be explained in more detail.

So as to detect the 10-bit signal, the maximum number of 10 grating couplers may be used. However, it is possible to obtain an arrangement of the grating couplers referred to the 1-bit value of the input signal "S" as shown to the left of FIG. 4 by disposing the grating coupler only where the bit value of the input signal is referred to "1" without disposing the grating coupler at the position where the bit value is "0".

Therefore, as shown in FIG. 4, when "1" of the bit value furthest to the right of the input signal reaches the position of the grating coupler furthest to the right among the grating couplers, 6 bits having the input signal value "1" and 6 grating couplers become accurately matched, whereby the intensity of the beam of the size of "6*Io" is detected by the optical detector.

Figure 5:
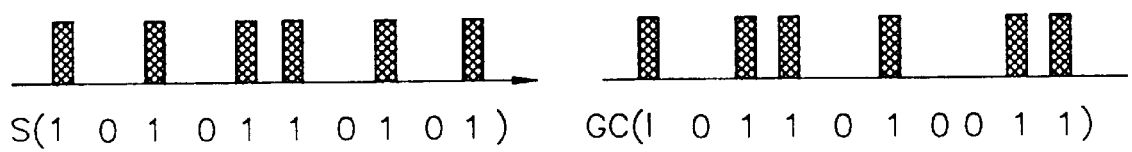
FIG. 5 is a view showing an example that the input signal, the grating coupler arrangement, and the input packet signal are not identified according to the present invention.

FIG. 5 shows an example that the input signal and the grating coupler arrangement and the input packet signal are not identical.

The above-mentioned example will now be explained in greater detail.

As shown on the right side of FIG. 5, the arrangement of the grating couplers is the same as in the right side portion of FIG. 4. When the input signal has a different bit signal arrangement as S=1010110101 in the left side portion of FIG. 5, the bit having a value of "1" among 10-bit consisting of the input signal is identical to the previous occasion, however when the bit signal and the grating coupler arrangement are folded, only 4-bit is referred to the occasion that 1-bit of the input signal and the grating coupler are folded.

Therefore, the optical intensity detected by the optical detector is referred to "4*Io" and has less value than that of FIG. 4.

The maximum value (the maximum value of 6×Io) is detected by the optical detector only when the grating coupler arrangement has an arrangement of 1-bit which is identical with the grating coupler arrangement.

Therefore, when the address at the side where receiving the packet signal is defined as an arrangement of the grating coupler, the occasion that the address is identical with the address at the position where receiving the input packet signal having an arrangement structure of 1-bit of the various input packet signal address structure is detected, and the input packet signal in which the maximum value is detected is recognized.

In addition, the optical packet address detection speed is determined by the distance between the grating couplers.

Referring to FIG. 3, the time interval "τ" between the interval "L" between the grating couplers and bit signals of the input optical packet address can be expressed by τ=nL/c, where n denotes the refractive index of the optical waveguide 12, and c denotes the speed of light in the vacuum.

Therefore, the shorter the interval "L" between the grating couplers, the shorter the time interval τ between the bit signals.

For example, when n=1.5, and τ=2 mm, the τ is $10^{-11}$.

When computing the result in bit/second units, since it is referred to 100 Gbit/second, it is possible to achieve the detector of 100 giga-class packet address.

As described above, since it is possible to increase the address detection speed up to 100 giga class, high speed optical communication network can be achieved.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. An optical packet address detector, comprising: comprising:

a glass substrate having a mirror disposed at a back side thereof;

a channel optical waveguide formed on said glass substrate and extended in a predetermined direction;

a plurality of grating couplers spaced-apart on said channel optical waveguide for dispersing a packet signal beam passing through said channel optical waveguide into an inner portion of said glass substrate;

an optical absorber attached to one end of said channel optical waveguide for absorbing part of the packet signal beam which is not dispersed by said grating couplers;

a reflective lens spaced-apart from said optical absorber by a predetermined distance and formed on said glass substrate for focusing the signal beam dispersed by said grating couplers and reflected by the mirror; and a detector spaced-apart from said reflective lens and formed on said glass substrate for detecting the signal beam incident on the mirror and reflected by the mirror.

2. The optical packet address detector of claim 1, wherein the number of said grating couplers is identical to the number of bits of the input packet signal.

3. The optical packet address detector of claim 1, wherein the number of said grating couplers is not identical to the number of bits of the input packet signal.

4. The optical packet address detector of claim 1, wherein the address detection speed is controlled in accordance with the interval of said grating couplers.

* * * * *